(No Model.)
C. A. BAKER.
FILTERING COMPOUND.
No. 286,370. Patented Oct. 9, 1883.
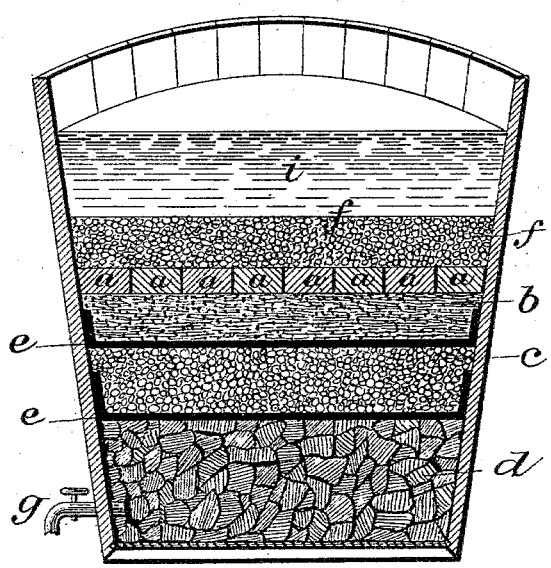
Attest:
Edmond Brodhag
H. C. Huntemann
Inventor.
Charles A. Baker
by Johnson & Johnson
Attys.

UNITED STATES PATENT OFFICE.

CHARLES A. BAKER, OF NEW YORK, N. Y.

FILTERING COMPOUND.

SPECIFICATION forming part of Letters Patent No. 286,370, dated October 9, 1883.

Application filed July 5, 1883. (No model.)

*To all whom it may concern:*

Be it known that I, CHARLES A. BAKER, a citizen of the United States, residing at the city of New York, in the county of New York and State of New York, have invented new and useful Improvements in Filtering Compounds, of which the following is a specification.

My invention consists of an artificial bone-black filtering-block, composed of bone-black and magnesia, whereby a porous filtering-block is produced.

The object of combining magnesia with the bone-black is to utilize the well-known disinfecting, clarifying, antiseptic, and deodorizing properties of the bone-black, and overcome the tendencies of the latter to become an impervious mass when used alone for a filter. In this combination the bone-black serves also to solidify the magnesia and prevent it from impregnating the water or other filtrate; and the porosity of the blocks is produced in the operation of drying them under a heat sufficient to evaporate the water used in effecting their combination. As a binding material to hold the particles compactly together and prevent cracking when dried, I use plaster-of-paris; and I may also use sand in the compound, when necessary to have the blocks extra porous; but my invention consists, broadly, in combining magnesia with bone-black in such manner as to form a plastic mass for use in the manufacture of porous filtering-blocks. The blocks may be used in any suitable filtering apparatus or device, and I have shown in the accompanying drawings one form of filter in which my artificial bone-black blocks may be used.

In the production of the artificial bone-black blocks, I take bone-black and magnesia in a finely-powdered state and mix them thoroughly together and with water sufficient to render the compound plastic, in which I may also use a small quantity of plaster-of-paris and sand when required. The proportions of these articles will be governed according to the degree of porosity required in the block to suit different liquids. The following proportions will give good results: bone-black, twenty parts, by weight; magnesia, seventy-nine parts, by weight; plaster-of-paris, one part, by weight. This compound will produce a porous block of artificial bone-black, in which the magnesia is made more solid and less soluble, and will produce a filtering-block which will be a most perfect clarifier, absorbent, and strainer, rendering the filtrate pure.

It will be understood that the articles composing the compound are first thoroughly mixed in a dry condition and the water then added to produce a plastic mass, which is placed in suitable molds. The molds are then placed in a suitable drying-room and thoroughly dried under a moderate heat of, say, about 120° Fahrenheit. It is in this drying operation that the blocks become porous by the action of the magnesia being in large proportion, while the bone-black renders the magnesia less soluble and gives it more solidity. The porous blocks may be thus produced and form a perfect filter; but I prefer to use plaster-of-paris in the compound to give a binding action to the particles composing the mass, and to prevent cracking in drying. In place of plaster-of-paris, any other binding material may be used, such as Portland cement, &c.

In applying the blocks for filtering I place one or more of them into a suitable vessel or apparatus in such manner that the liquid to be filtered must percolate through the same.

In case several blocks are used the joints between them should be closed by plaster-of-paris, or other suitable material.

In the form of filter shown in the drawings, the usual filtering substances—such as charcoal, gravel, and fine sand—are used in different layers, and upon these my porous artificial bone-black filtering-blocks, $a$, are placed, with a layer of gravel, sand, or other article that will allow the water to pass through it and to hold the porous blocks down in place.

The blocks may be of any suitable form and size to suit the filter, and should be placed flatwise within the filter. They may be easily removed and replaced by new ones, when desired, at little expense. They may be laid in single or double layers.

The filtering layers of charcoal, gravel, and sand, are separated by suitable fabric.

The drawing represents a vertical section of a filter, showing the manner of using my filtering-blocks, in which—

$a$ are the blocks; $b$, a layer of sand; $c$, a layer of gravel; and $d$, the charcoal—these filtering substances being separated by suitable fabric, e; and f is a layer of gravel or equivalent material placed upon the blocks to hold them in place within the vessel, which may be of any suitable construction, and is provided with a cock, g, communicating with the charcoal-chamber. i represents the water or other liquid to be purified.

I claim—

1. A filtering compound consisting of bone-black and magnesia, substantially in the manner described.

2. A filtering-block formed of bone-black and magnesia, substantially as hereinbefore described.

3. A filtering compound consisting of bone-black, magnesia, and a binding material, substantially as described.

4. A filtering-block formed of bone-black, magnesia, and a binding material, substantially as hereinbefore described.

5. A filtering compound consisting of bone-black, magnesia, plaster-of-paris, and sand, substantially as described.

6. A filtering-block formed of bone-black, magnesia, plaster-of-paris, and sand, substantially as described.

In testimony whereof I have hereunto set my hand in the presence of two subscribing witnesses.

CHARLES A. BAKER.

Witnesses:
 THEO. K. TUTHILL,
 J. W. HAMILTON JOHNSON.